US012052999B2

(12) United States Patent
Nielsen et al.

(10) Patent No.: US 12,052,999 B2
(45) Date of Patent: Aug. 6, 2024

(54) PROCESS FOR PRODUCING MILK AND MILK-RELATED PRODUCTS WITH EXTENDED SHELF LIFE

(71) Applicant: SPX FLOW TECHNOLOGY DANMARK A/S, Silkeborg (DK)

(72) Inventors: Rene Jeppe Nielsen, Hedensted (DK); Torben Slots, Tjele (DK); Ole Poulsen, Engesvang (DK)

(73) Assignee: SPX Flow Technology Danmark A/S, Silkeborg (DK)

( * ) Notice: Subject to any disclaimer, the term of this patent is extended or adjusted under 35 U.S.C. 154(b) by 397 days.

(21) Appl. No.: 17/272,008

(22) PCT Filed: Aug. 30, 2019

(86) PCT No.: PCT/EP2019/073268
§ 371 (c)(1),
(2) Date: Feb. 26, 2021

(87) PCT Pub. No.: WO2020/043907
PCT Pub. Date: Mar. 5, 2020

(65) Prior Publication Data
US 2022/0117245 A1    Apr. 21, 2022

(30) Foreign Application Priority Data

Aug. 31, 2018    (DK) .............................. PA201870562

(51) Int. Cl.
*A23C 3/02*  (2006.01)
*A23C 9/14*  (2006.01)
*A23C 9/15*  (2006.01)

(52) U.S. Cl.
CPC ................. *A23C 3/02* (2013.01); *A23C 9/14* (2013.01); *A23C 9/1516* (2013.01); *A23C 2210/252* (2013.01); *A23C 2210/254* (2013.01)

(58) Field of Classification Search
CPC ........... A23C 3/02; A23C 9/14; A23C 9/1516; A23C 2210/252; A23C 2210/254
USPC ....................................................... 426/586
See application file for complete search history.

(56) References Cited

U.S. PATENT DOCUMENTS

| 2012/0015082 A1* | 1/2012 | Holst ..................... A23C 3/037 426/585 |
| 2014/0302219 A1 | 10/2014 | Tikanmaki et al. |
| 2018/0027864 A1 | 2/2018 | Kallioinen et al. |

FOREIGN PATENT DOCUMENTS

| DE | 102010025664 A1 | 1/2012 |
| WO | 2010/085957 A2 | 8/2010 |
| WO | 2017/109466 A1 | 6/2017 |

OTHER PUBLICATIONS

Rauh et al., Plasmin Activity in UHT Milk: Relationship between Proteolysis, Age Gelation, and Bitterness; J. Agric. Food Chem. 2014, 62, 28, 6852-6860. (Year: 2014).*
International Search Report from PCT/EP2019/073268; mailed Nov. 13, 2019.
Rauh et al., "Plasmin Activity in UHT Milk: Relationship between Proteolysis, Age Gelation, and Bitterness," Journal of Agriculture and Food Chemistry, 2014, vol. 62, pp. 6852-6860.
Van Asselt et al., "Extreme high-temperature treatment of milk with respect to plasmin inactivation," International Dairy Journal, 2008, vol. 18, pp. 531-538.
Chapter 'Novel Methods of Milk Processing' in: Handbook "Milk Processing and Quality Management," Wiley-Blackwell, 2009, 343 pages, pp. 220-221.
Pinto et al., "Innovative Steam Injection for Milk Processing," Technical Articles, National Seminar on "Indian Dairy Industry—Opportunities and Challenges," 2015, pp. 130-132.
Huijs et al., "High Speed Milk," Dairy Industries International, Nov. 2004, pp. 30-32.
Communication of Notice of Opposition in European Application No. 19762365.5 and Notice of Opposition, dated Nov. 14, 2023.
Applicants Reply to the Notice of Opposition, dated Mar. 22, 2024.

* cited by examiner

*Primary Examiner* — Brent T O'Hern
(74) *Attorney, Agent, or Firm* — IceMiller LLP

(57) ABSTRACT

Disclosed is process for producing milk and milk-related products with extended shelf life. The process comprises the steps of separating whole milk is a cream fraction and a skimmed milk fraction, wherein the skimmed milk fraction has a fat content of 0.5% by weight or less, subjecting the skimmed milk fraction to a heat treatment, said heat treatment comprising heating the skimmed milk fraction to 152° C. to 165° C. for 500 ms or less, and cooling of the skimmed milk fraction to a temperature at or below 70° C. The produced milk and milk-related products maintains a high degree of undenatured whey protein despite the high treatment temperature.

17 Claims, No Drawings

PROCESS FOR PRODUCING MILK AND MILK-RELATED PRODUCTS WITH EXTENDED SHELF LIFE

CROSS-REFERENCE TO RELATED APPLICATIONS

The present application is a National Stage of International Patent Application No. PCT/EP2019/073268, filed on Aug. 30, 2019, and claims priority to Danish Patent Application No. PA201870562, filed on Aug. 31, 2018, the contents of each of which are incorporated herein by reference in their entirety.

TECHNICAL FIELD

The disclosure relates to a process for producing milk and milk-related products with extended shelf life. The products maintain a high level of whey proteins, indicative of a low degree of decomposition of the proteins and other components during the processing.

BACKGROUND

As an agricultural product, milk is produced by extraction from the mammary glands of cattle, water buffalo, goats, sheep and more rarely camels, horses and donkeys. Milk is an important source of nutrition for infants and grownups as well in many cultures.

Milk is usually collected at dairies from farmers and subsequently distributed to the consumers. Due to risk of the presence of pathogens in the milk the dairies usually heat treat the milk to destroy the pathogens or at least weakens their action. The result of the heat treatment should reduce the health hazards arising from pathogenic microorganisms associated with milk. As heat treatment can also degrade components of the milk it is a separate goal to maintain the nutritional value as much as possible and reducing the influence on the taste and smell.

Pasteurisation is a relative mild treatment of milk in which the milk typically is heated to 72° C. for 15 seconds. The pasteurisation treatment destroys most of the vegetative pathogenic organisms (bacteria, yeasts, and moulds), which may cause food poisoning. Sterilization is a more severe heat treatment (typically 121° C. for 3 min.) and destroys all microorganisms (vegetative and spores) or renders them incapable of further growth.

Pasteurisation is a preferred way of heat treatment when the milk product is going to be consumed within a relatively short time and the cooling chain can be maintained. In the event the milk product is intended for storage for a longer time, i.e. exceeding weeks or months and/or the milk product is stored at ambient temperature, sterilisation is generally the preferred method of heat treatment.

Elevating the heat treatment to the level used in sterilisation increases the chemical, physical, sensory, and nutritional degradation of the final product. Sterilisation temperatures may cause undesirable changes in the milk: decreased pH, calcium precipitation, protein denaturation, Maillard browning, and modification of casein. These changes are important and affect the sensory characteristics and the nutritional value.

Ultra high temperature (UHT) processing of milk generally takes place at temperatures around 143° C. for around 6 seconds. The UHT treatment is usually performed as a continuous flow process, where the milk after the heat treatment, is rapidly cooled and packaged. UHT milk undergoes fewer chemical alterations than sterilized milk, resulting in a product that is whiter, tastes less caramelised, has reduced whey protein denaturation, and reduced loss of heat-sensitive vitamins. Even so, the development of off-flavours, especially stale or oxidized flavour, during storage is the most important factor limiting the acceptability of UHT milk. The off-flavour development is associated with chemical reactions and changes (e.g. Maillard reaction and browning) that occur during processing and continue during subsequent storage.

Denaturing of whey proteins during the heat treatment causes reduced taste quality of the milk. β-lactoglobulin represents about 50% of total whey protein and 12% of the total protein in milk. β-lactoglobulin contains two intramolecular disulphide bonds and 1 mole of cysteine per monomer of 18 kDa. During the heat treatment it is supposed that the reactions form a volatile compound responsible for the cooked flavour of heated milk.

It is the traditional wisdom that denaturation of β-lactoglobulin involves firstly dissociation of its very compact dimeric structure and then unfolding of the globular monomer. The latter step exposes an active free sulphydryl group which is normally buried inside the globular structure. This —SH group, or another group resulting from intramolecular sulphydryl-disulphide reactions, allegedly interacts with other —SH groups in intermolecular sulphydryl-disulphide reactions. These reactions occur between molecules of β-lactoglobulin, but also significantly between β-lactoglobulin and K-casein, and between β-lactoglobulin and α-lactalbumin.

In an aspect of the present invention, it is the object to reduce the off-flavours of milk treated at ultra high temperatures by reducing the denaturing of the whey proteins, such as β-lactoglobulin, during the heat treatment.

An attempt to reduce the cooked taste of milk treated at ultra-high temperatures is disclosed in WO 2010/085957, in which a physical separation of microorganisms is initially performed prior to the heat treatment. After the separation of the microorganisms the milk product is treated at a temperature of 150° C. for 90 ms and then finally cooled before aseptically packaging. The removal of microorganisms is performed in a microfiltration device using isoflux ceramic tubular membranes for tangential microfiltration, where a retentate is recirculate at a certain flow rate, to produce a filtrate free for microorganisms. It is stated that the removal or microorganisms prior to the heat treatment improves the taste and in particular reduce the cooked taste.

However, the recirculation of the retentate results in that a certain amount of the final retentate in which the up-concentrated microorganisms are present, must be disposed of. Thus, it is estimated that 1-2% of the original amount of milk is lost in the process. Furthermore, the removal of microorganism requires investment in a microfiltration device and associated equipment like pumps, pipes, valves etc. The microfiltration device increases the footprint of the entire plant and thus requires more space in the dairy. Finally, the presence of the microfiltration device complicates the process, necessitates investments in surveillance equipment, and increases the risk of failure. The present invention seeks to avoid or ameliorate one or more of these disadvantages.

SUMMARY

It is an object to provide a process for producing milk and milk-related products with extended shelf life comprising the steps of:

a. Separating whole milk as a cream fraction and a skimmed milk fraction, wherein the skimmed milk fraction has a fat content of 0.5% by weight or less,
b. Subjecting the skimmed milk fraction to a heat treatment, said heat treatment comprising heating the skimmed milk fraction to 152° C. to 165° C. for 500 ms or less, and
c. Cooling of the skimmed milk fraction to a temperature at or below 70° C.

The milk and the milk-related product obtained by the process surprisingly shows a reduced degradation of whey protein, such as β-lactoglobulin. The maintenance of a high degree of the whey protein in the milk preserve the natural taste in the treated milk and results in a nutritional value close that of the skimmed milk fraction prior to the heat treatment. The degree of denaturation of whey protein is an indicator of the denaturation of the other proteins of the milk serum. A low degree of denaturation indicates a higher amount of bioactive proteins and therefore a healthier long shelf life milk product than is obtained in comparable long shelf-like products of the prior art.

Without being bound by theory, it is presently believed that the reduced degradation of whey protein is at least in part due to a low concentration of fat or cream in the skimmed milk fraction. By a chemical process not know presently and occurring at the temperatures of the present process, the fat is believed to react with the whey protein or otherwise accelerate the degradation of the whey protein. In a certain embodiment of the invention, the treated skimmed milk fraction of step c. contains denatured β-lactoglobulin in an amount of 40% or less, such as 30% or less, and preferably 20% or less of the β-lactoglobulin originally present in the skimmed milk fraction of step a.

In the context of the present invention, the term "milk or milk-related product" relates to milk-based products which may contain many, if not all, of the components of skimmed milk and optionally may contain various amounts non-dairy additives such as non-dairy flavors, sweeteners, minerals and/or vitamins.

The term "long shelf life", when used in the context of the present invention, relates to products, which have shelf-lives longer than ordinary pasteurized milk. In the context of the present invention, the term "extended shelf life" or ESL is used as a synonym for "long shelf life".

The process of the invention may preferably be used for treating fresh whole milk, i.e. milk recently milked from the source of the milk derivative, e.g. from cows. For example, it may be preferred that the milk is at most 48 hours old, i.e. at most 48 hours since milking, and more preferably at most 36 hours old, such as at most 24 hours old.

The cream of milk fat may be separated from whole milk in a number of ways readily available in the prior art. Thus, the milk may be allowed to settle until the cream floats on top and then recovering either the top fraction by decanting or the bottom fraction by draining. In a preferred aspect of the invention, the whole milk is separated in the cream fraction and the skimmed milk fraction by centrifugation. Centrifugation offers a faster separation process as the time to settle is dispensed with. Furthermore, separation by centrifugation offers the possibility of adjusting the remaining amount of fat in the skimmed milk to a predetermined level. Prior to the separation in the cream and the skimmed milk fractions, the milk may be pre-heated, usually in a Plate Heat Exchanger (PHE).

While the skimmed milk produced by the separation process may be used directly in the heating treatment, it is generally suitable that the skimmed milk fraction is pre-treated by pasteurization prior to step b. The pasteurization is generally performed at 70° C. to 75° C. for 10 to 30 seconds. Preferably, this pasteurization step is conducted at 72° C. for 15 s, also known as a High Temperature Short Time (HTST) pasteurization. The skimmed milk fraction used in the present invention may be also be lactose-free or lactose-reduced milk produced by hydrolyzing the lactose by lactase enzyme to glucose and galactose, or by other methods such as nanofiltration, electrodialysis, ion exchange chromatography and centrifugation technology. In the context of the present invention, the term "lactose-reduced milk" relates to a milk comprising at most 0.5 g lactose per kg milk. The term "lactose-free milk" relates to a milk comprising at most 0.05 g lactose per kg milk.

An important aspect of the present invention is that microfiltration or other kinds of physical separation are not required. Thus, in an aspect of the invention the skimmed milk fraction is pre-treated by pasteurization prior to step b. or step b. takes place directly after step a. or directly after the pre-treatment. It has surprisingly been observed that the presence of a minor amount of microorganisms does not significantly influence the perceived quality of the treated skimmed milk, including the taste and smell of the treated skimmed milk. In the context of the present invention, the term "microorganisms" relates to e.g. bacteria and bacterial spores, yeasts, molds and fungal spores. Thus, it is preferred that the whole milk used in step a. is of good quality comprising at most 100,000 colony forming units (cfu)/ml, preferably at most 50,000 cfu/ml, and even more preferably at most 25,000 cfu/ml. It may even be preferred that the milk derivative comprises at most 10,000 cfu/ml, such as at most 7,500 cfu/ml.

The heat treatment of step b. is usually performed at a temperature of 152° C., or above, such as 153° C. or above, such as 154° C. or above, and preferable 155° C. or above. Usually, the temperature of the heat treatment of step b. does not exceed 165° C. Suitably, the temperature of the heat treatment does not exceed 164° C., such as 163° C., such as 162° C., such as 161° C., and preferably does not exceed 160° C. In a preferred aspect of the invention the heat treatment comprises heating the skimmed milk fraction to 153° C. to 159° C. In a most preferred embodiment of the invention, the heat treatment is performed at a temperature of 154° C.+/−1° C. or 157° C.+/−1° C.

The residence time at the temperature for the heat treatment is usually at or below 500 ms to avoid excessive deterioration of the milk components, such as the whey proteins. In preferred embodiments, the heat treatment is performed within 300 ms or less, such as within 100 ms or less. Usually, the heat treatment duration is more than 10 ms, such as 50 ms, such as 70 ms. In a preferred embodiment the duration of the heat is around 90 ms+/−5 ms.

The heating rate is suitably 200° C./s or higher, such as 300° C./s or higher, and preferably 400° C./s or higher to obtain the temperature detrimental to the microorganisms without affecting the components of the skimmed milk fraction more than necessary during the heating process. In a preferred embodiment, the heating rate is 500-700° C./s. The heating is generally performed by intimate mixing of droplets of the skimmed milk fraction with steam by a process generally known as direct steam injection (DSI). Another suitable technique is steam infusion wherein the liquid is infused into a steam-filled chamber. The temperature of the steam for injection or infusion is typically somewhat higher than the desired treatment temperate, for example at most 10° C. higher than the desired treatment temperate, preferably at most 5° C., an even more preferred at most 3° C. higher.

The cooling rate is suitably −200° C./s or higher, such as −300° C./s or higher, and preferably −400° C./s or higher to limit the effect on the components of the skimmed milk fraction during the cooling process. In a preferred embodiment, the cooling rate is −500 to −700° C./s. The cooling is generally performed by flash cooling, i.e. exposing the skimmed milk fraction at a high temperature and pressure to an environment of lower pressure. Typically, the heat treated skimmed milk fraction is sprayed as a hot liquid or aerosol into a vacuum chamber, whereby part of the liquid evaporates and rapidly cools the remaining liquid.

An example of a useful heat treatment system is the Instant Infusion System (IIS) of SPX Flow. The heat treatment system is the subject-matter of the international patent applications WO 96/16556 (A1), which is incorporated herein by reference in its entirety. Further development of the heat treatment system is disclosed WO 2016/012025, WO 2016/012026, and WO 2018/115131 incorporated herein by reference in its entirety. WO 2016/012025 discloses a cooling jacket that surrounds the bottom section of the infusion chamber for cooling the walls to reduce fouling and an optical camera mounted on the infusion chamber with an angle of view covering at least a portion of the bottom section. WO 2016/012026 discloses that the bottom section has an outlet opening at the bottom of the infusion chamber for allowing the collected fluid foodstuff to exit the infusion chamber. The outlet opening is seamlessly connected to the inlet of a pump and a cooling jacket surrounds the bottom section for cooling the bottom section. The cooling jacket extends all the way down to the pump. WO 2018/115131 discloses a heat treatment system in which the steam for the heating of the skimmed milk fraction is flash steam as well as live steam. The flash steam originating from the flash vessel is connected to a compression arrangement for compressing the steam to a temperature and pressure suitable for the heat treatment.

While the skimmed milk fraction may have a fat concentration as high as 0.5% by weight, it is generally preferred that the skimmed milk fraction has a fat content of 0.3% by weight or less, such as 0.1% by weight or less.

In a preferred aspect of the invention, the content of fat in the skimmed milk fraction is 0.05% by weight +/−0.02% by weight. Generally, the lower the content of fat, the lower degradation of the whey protein.

The cream may be transferred back to the treated skimmed milk to obtain a milk-related product with a desired fat content. In a certain embodiment, the treated skimmed milk fraction is blended with the treated cream fraction to obtain a fat content of between 0.5% by weight and 4% by weight. Before the mixing of cream and the treated skimmed milk, generally, the cream fraction is treated at 100-180° C. for a period of 10 ms to 4 s. In a preferred aspect of the invention, the cream is heated to around 147° C.+/−5° C. for 0.5 s to 2 s. The heat treatment of the cream may be equivalent to an UHT treatment and ensures that the microorganisms and optional spores are attenuated or killed. As will be clear to the person skilled in the art, the mixing step may be followed by a homogenization step.

As an alternative or an addition to cream, the treated skimmed milk may be added one or more non-dairy lipid sources, such as a vegetable fat and/or a vegetable oil. This is typically the case when the milk or milk-related product is a so-called filled milk, i.e. a milk product wherein at least a portion of the original milk fat has been replaced with a non-dairy lipid source such as vegetable oil or vegetable fat. The vegetable oil may e.g. comprise one or more oils selected from the group consisting of sunflower oil, corn oil, sesame oil, soya bean oil, palm oil, linseed oil, grape seed oil, rapeseed oil, olive oil, groundnut oil and combinations thereof. If a vegetable fat is desired, the vegetable fat may e.g. comprise one or more fats selected from the group consisting of palm oil-based vegetable fat, palm kernel oil-based vegetable fat, peanut butter, cacao butter, coconut butter, and combinations thereof.

The treated skimmed milk may also be added other milk fat sources, such as one or more milk fat sources selected from the group consisting of a cream from other batches or animals, a cream double, an anhydrous butter fat, a whey cream, a butter oil, a butter oil fraction, and combinations thereof. Production of long shelf life milk typically involves UHT-treatment of the milk fat fraction of the milk.

Following the cooling and optional mixing with cream or other lipid sources, the milk or milk-derived product is packaged in a packaging section, usually in fluid communication with the heat treatment section. In a preferred embodiment of the invention, the packaging is performed aseptically, i.e. the milk or milk-related product is packaged under aseptic conditions. For example, the aseptic packaging may be performed by using an aseptic filling system, and it preferably involves filling the milk into one or more aseptic container(s). Examples of useful containers are e.g. bottles, cartons, bricks, and/or bags.

The packaging is preferably performed at or below room temperature. Thus, the temperature of the second composition is preferably at most 30° C. during the packaging, preferably at most 25° C. and even more preferably at most 20° C. such as at most 10° C.

At any stage prior to packaging, the milk or milk-derived product may be added one or more additives. For example, the added additive may be a useful flavor such as e.g. strawberry, chocolate, banana, mango, and/or vanilla. Alternatively, or in addition, the one or more additives may contain one or more vitamins. Useful vitamins are e.g. vitamin A and/or vitamin D. Other vitamins such as vitamin B, C, and/or E may also be useful. Alternatively, or in addition, the one or more additives may also contain one or more mineral supplements, such as a calcium supplement. Another useful additive is whey protein.

The milk or milk-related product obtained by the present process maintains a high remaining amount of the whey protein despite the high temperature used in the heat treatment. In a preferred embodiment, the milk or milk-related product maintains 80% by weight or more, such as 90% by weight or more, of the whey protein originally present in the milk. Typically, the milk or the milk-related product comprises 2.5-4.5% by weight casein, 0.25-1% by weight milk serum protein, and 0.01-0.1% by weight milk fat.

An exemplary embodiment of the present invention provides a milk or milk-related product with an extended shelf life, where the product retains most of the nutritional and organoleptic properties of whole milk, while being sterile or at least having a significantly reduced microbiological content (viable spore count). The improved properties of the product are generally obtained without the use of additives (for example inhibitors of milk staling) and do not depend on the use of irradiation sterilization. The milk or milk-related product, according to one exemplary embodiment of the present invention, has an extended shelf life comparable to that of UHT milk, such that it can be consumed up to 6 months after manufacture, while retaining the desirable flavor of fresh milk.

The extended shelf life of the milk or milk-related product of the present invention is due to low or absent residual level of viable microorganisms. When measured immediately following processing and packaging (under aseptic conditions) the product suitably has a viable spore count, measured as colony forming units/millilitre (cfu/ml) of 1,000 cfu/ml or less, such as 500 cfu/ml or less, such as 100 cfu/ml or less, such as 50 cfu/ml or less, such as 10 cfu/ml or less, such as 1 cfu/ml or less, and preferably 1 cfu/ml or less. In a preferred embodiment of the invention, the milk or milk-related product contains 0 cfu/ml.

Due to its long shelf life and robustness to higher temperatures, the present milk or milk-related products can be transported at ambient temperature instead of at 5° C. Low temperature logistics are highly energy consuming and typically require transportation of a relatively higher number of small, cooled loads of product, than a comparable ambient temperature logistic set-up. Milk or milk-related products of the present invention may therefore be produced and transported to the retailers with a lower $CO_2$ emission than prior art milk products having a similar high amount of whey protein.

EXAMPLE 1

Whole milk was separated in a cream fraction and a skimmed milk fraction by centrifugation. The skimmed milk fraction was preheated at 72° C. for 15 seconds, i.e. pasteurized, and subsequently heated to 157° C. for 0.09 seconds and flash cooled to 70° C. or below. For comparison purposes a part of the skimmed milk fraction was also after the preheating treated by the standard instant infusion (UHT) process using heating to 143° C. for 6 seconds.

Whole milk was treated similarly as shown in the table below:

TABLE 1

All figures are in % by weight.

|  | Skimmed milk Feed | Skimmed milk 157° C. 0.09 s | Skimmed milk 143° C. 6 s | Whole milk feed | Whole milk 157° C. 0.09 s | Whole milk 143° C. 6 s |
|---|---|---|---|---|---|---|
| Fat %(w/w) | 0.05 | 0.05 | 0.05 | 3.90 | 3.90 | 3.90 |
| Whey protein %(w/w) | 0.498 | 0.459 | 0.274 | 0.536 | 0.357 | 0.236 |
| % denat. |  | 7.8 | 45.0 |  | 33.4 | 56.0 |

The data in the table shows that only 7.8% by weight of the whey proteins are denatured by the process according to the present invention. In contrast, 33.4% by weight of the whey protein is denatured for whole milk, which indicated that the amount of fat plays a crucial role in the denaturing of whey proteins in milk and milk derived products.

The data also shows that temperature and time is of importance for the denaturing of whey proteins. Thus, when the treatment regimen for the skimmed milk is changed to 143° C. for 6 s, the degree of denaturation increases to 45.0%. Similarly, the degree of denaturing of whole milk increases to 56.0% when the whole milk is treated at 143° C. for 6 s.

The skimmed milk treated as indicated above may be used in its own right or be mixed with the cream for the preparation of a milk derived product having an elevated fat content. Before the cream fraction is mixed with the treated skimmed milk it may be treated at 147° C. for 1 s, i.e. an UHT treatment. After mixing of the UHT treated cream and the treated skimmed milk the mixture may be homogenized at 240-40 bar.

EXAMPLE 2

Whole milk was separated in a cream fraction and a skimmed milk fraction by centrifugation. The skimmed milk fraction was preheated at 72° C. for 15 seconds, i.e. pasteurized, and subsequently heated to 154° C. for 0.250 seconds and flash cooled to 70° C. or below. For comparison purposes a part of the skimmed milk fraction was also after the preheating treated by the standard instant infusion (UHT) process using heating to 143° C. for 6 seconds.

As a control experiment, milk having a reduced fat content of 1.6% by weight fat was treated similarly as shown in the table below:

TABLE 2

|  | Skimmed milk Feed | Skimmed milk, 154° C. 0.25 s | Fat reduced whole milk feed | Fat reduced whole milk 154° C. 0.25 s |
|---|---|---|---|---|
| Fat %(w/w) | 0.02 | 0.02 | 1.60 | 1.60 |
| Whey protein %(w/w) | 0.606 | 0.549 | 0.542 | 0.396 |
| % denatured |  | 9.4 |  | 26.9 |
| Beta-Lactoglobulin [ppm] | 5465 | 4560 | 4888 | 2590 |
| % Beta-Lactoglobulin denaturation |  | 16.6 |  | 47.0 |

The data in the Table 2 shows that only 16.6% by weight of the Beta-Lactoglobulin proteins are denatured by the process according to the present invention. In contrast 47.0% by weight of the Beta-Lactoglobulin is denatured in fat reduced whole milk, which indicates that the amount of fat plays a crucial role in the denaturation of Beta-Lactoglobulin and whey proteins, when processed at short holding times <0.5 sec and very high temperatures >150° C.

The data in the Table 2 with only 16.6% denaturation by weight of the Beta-Lactoglobulin proteins in skim milk is crucial information, because cooked taste in milk is known to be more pronounced in milk with high Beta-Lactoglobulin denaturation, like >40% denaturation, more likely in >60% denaturation and even more likely in >80% denaturation as in conventional UHT or Autoclaved milk. Pasteurized milk, i.e. milk treated at 72° C. for 15 s is known to have also close to zero denaturation of Beta-Lactoglobulin and also known to have no cooked taste.

The data in the Table 2 also shows that only 9.4% by weight of the whey proteins in the skimmed milk are denatured by the process according to the present invention. In contrast, 26.9% by weight of the whey proteins is denatured in fat reduced whole Milk. The data suggest that the amount of fat plays a crucial role in the denaturation of whey proteins, when processed at short holding times <0.5 sec and very high temperatures >150° C.

The invention claimed is:

1. A process for producing a skimmed milk fraction comprising the steps of:
   a. separating a whole milk as a cream fraction and a skimmed milk fraction, wherein the skimmed milk fraction has a fat content of 0.05%-0.5% by weight and the skimmed milk fraction being subjected to a pre-treatment by pasteurization performed at 70° C. to 75° C. for 10 to 30 seconds without microfiltration or physical separation of microorganism in the skimmed milk fraction;
   b. subjecting the skimmed milk fraction to a heat treatment, said heat treatment comprising heating the skimmed milk fraction to 152° C. to 165° C. for a time of 500 ms or less; and
   c. flash cooling of the skimmed milk fraction to a temperature at or below 70° C.

2. The process according to claim 1, wherein the skimmed milk fraction of the step c., which has been subjected to the heat treatment of the step b., contains denatured β-lactoglobulin in an amount of 40% or less of a β-lactoglobulin originally present in the skimmed milk fraction of the step a.

3. The process according to claim 1, wherein the step b. takes place directly after the pre-treatment.

4. The process according to claim 1, wherein the heat treatment comprises heating the skimmed milk fraction to 153° C. to 159° C. for the time of 500 ms or less.

5. The process according to claim 1, wherein the heat treatment is performed for 300 ms or less.

6. The process according to claim 1, wherein the skimmed milk fraction obtained by separating the whole milk in the step a. has a fat content of 0.05%-0.3% by weight.

7. The process according to claim 1, wherein the cream fraction is treated at 100-180° C. for a period of 10 ms to 4 s.

8. The process according to claim 1, further comprising the step of:
   d. blending the skimmed milk fraction which has been subjected to the heat treatment of the step b. with a heat treated cream fraction to obtain a milk product having a fat content of 0.5% by weight to 4% by weight.

9. The process according to claim 1, wherein the whole milk, which has been subjected to the heat treatment of the step b., maintains 80% by weight or more of a whey protein originally present in the whole milk.

10. The process according to claim 1, wherein the skimmed milk fraction of the step c., which has been subjected to the heat treatment of the step b., contains denatured β-lactoglobulin in an amount of 30% by weight or less of a β-lactoglobulin originally present in the skimmed milk fraction of the step a.

11. The process according to claim 1, wherein the skimmed milk fraction of the step c., which has been subjected to the heat treatment of the step b., contains denatured β-lactoglobulin in an amount of 20% or less of a β-lactoglobulin originally present in the skimmed milk fraction of the step a.

12. The process according to claim 1, wherein the heat treatment is performed for 100 ms or less.

13. The process according to claim 1, wherein the skimmed milk fraction obtained by separating the whole milk in the step a. has a fat content of 0.05%-0.1% by weight.

14. The process according to claim 1, wherein the whole milk, which has been subjected to the heat treatment of the step b., maintains 90% by weight or more of a whey protein originally in the whole milk before the separating in the step a.

15. A process for producing a skimmed milk fraction comprising the steps of:
   a. separating a whole milk into a cream fraction and a skimmed milk fraction having a fat content of 0.05%-0.5% by weight and pre-treating the skimmed milk fraction by pasteurization performed at 70° C. to 75° C. for 10 to 30 seconds directly after the separating;
   b. heating the skimmed milk fraction to 152° C. to 165° C. for a time of 500 ms or less directly after the pre-treating; and
   c. cooling of the skimmed milk fraction to a temperature at or below 70° C.

16. The process according to claim 15, wherein the separating comprises centrifugation.

17. The process according to claim 15, wherein the process does not require microfiltration or physical separation of microorganisms in the skimmed milk fraction.

* * * * *